United States Patent
Jung et al.

(10) Patent No.: US 10,611,858 B2
(45) Date of Patent: Apr. 7, 2020

(54) METHOD FOR PREPARING LOW-MOLECULAR-WEIGHT AMORPHOUS POLYPROPYLENE AND COPOLYMER THE SAME

(71) Applicant: KOREA PETROCHEMICAL IND. CO., LTD., Seoul (KR)

(72) Inventors: Yeon Jae Jung, Ulsan (KR); Jung Hwa Baek, Ulsan (KR); Hyun Soo Ha, Ulsan (KR); Gil Soon Kang, Seoul (KR); Young Tae Jeong, Seoul (KR)

(*) Notice: Subject to any disclaimer, the term of this patent is extended or adjusted under 35 U.S.C. 154(b) by 0 days.

(21) Appl. No.: 15/796,109

(22) Filed: Oct. 27, 2017

(65) Prior Publication Data

US 2018/0127521 A1   May 10, 2018

(30) Foreign Application Priority Data

Oct. 28, 2016   (KR) .................. 10-2016-0141616

(51) Int. Cl.
| | |
|---|---|
| *C08F 4/64* | (2006.01) |
| *C08F 4/52* | (2006.01) |
| *C08F 210/06* | (2006.01) |
| *C08F 10/06* | (2006.01) |
| *C08F 4/602* | (2006.01) |

(52) U.S. Cl.
CPC ............ *C08F 10/06* (2013.01); *C08F 210/06* (2013.01); *C08F 4/6024* (2013.01); *C08F 4/6026* (2013.01); *C08F 2800/20* (2013.01)

(58) Field of Classification Search
CPC ......... C08F 4/64; C08F 4/6024; C08F 4/6026
See application file for complete search history.

(56) References Cited

U.S. PATENT DOCUMENTS

| | | | | |
|---|---|---|---|---|
| 4,736,002 A | * | 4/1988 | Allen ................... | C08F 210/06 526/124.7 |
| 6,228,792 B1 | * | 5/2001 | Carney ................. | C08F 10/00 502/104 |
| 6,809,056 B1 | * | 10/2004 | Choi ...................... | C08F 10/02 502/102 |

* cited by examiner

*Primary Examiner* — Rip A Lee
(74) *Attorney, Agent, or Firm* — Antonio Ha & U.S. Patent, LLC

(57) ABSTRACT

According to the present invention, there is provided a method for preparing low molecular weight amorphous polypropylene. In contrast to the prior art in which amorphous polypropylene is prepared by injecting an internal donor and an external donor upon preparing a primary catalyst, the present invention enables easier preparation of low molecular weight amorphous polypropylene and a copolymer thereof by simply mixing a primary catalyst with an alkylaluminum-based co-catalyst without injecting an internal donor, upon preparing a primary catalyst, and an external donor, upon polymerization. According to the present invention, the primary catalyst has superior reactivity with hydrogen, as chain transfer agent, allowing for preparation of low molecular weight amorphous polypropylene even under low hydrogen pressures and low-pressure driving conditions.

5 Claims, 2 Drawing Sheets

METHOD FOR PREPARING LOW-MOLECULAR-WEIGHT AMORPHOUS POLYPROPYLENE AND COPOLYMER THE SAME

CROSS-REFERENCE TO RELATED APPLICATIONS

This patent application claims priority under 35 U.S.C. § 119 to Korean Patent Application No. 10-2016-0141616, filed on Oct. 28, 2016, in the Korean Intellectual Property Office, the disclosure of which is incorporated by reference herein in its entirety.

TECHNICAL FIELD

The present invention relates to a method for preparing low molecular weight amorphous polypropylene and a copolymer thereof, and more specifically, to a method for easily preparing amorphous polypropylene and a copolymer thereof by simply mixing a catalyst with an alkyl aluminum co-catalyst without adding an internal donor and an external donor upon preparing the primary catalyst.

DISCUSSION OF RELATED ART

It is generally known that crystalline polypropylene has an isotactic and syndiotactic molecular structure and amorphous polypropylene has an atactic molecular structure. Isotactic polypropylene has methyl groups positioned at the same side with respect to the polymer chain, and syndiotactic polypropylene has methyl groups positioned alternately with respect to the polymer chain. Isotactic and syndiotactic polypropylene show high crystallinity due to the regularity in molecular structure. Due to its irregularity in molecular structure, amorphous polypropylene features low crystallinity (heat capacity enthalpy: 70 J/g or less) and low molecular weight as compared with crystalline polypropylene.

Amorphous polypropylene, by its sticky nature, began to draw attention commercially as material for adhesives. Conventionally, an internal donor and an external donor are applied to an MgR1R2 catalyst structure as follows to prepare amorphous polypropylene. R1 is the alkoxy or aryl oxide group, and R2 is the alkoxide, aryl oxide, or halogen group. As the internal donor, silane-based and amine-based, particularly cyclohexylmethyldimethoxysilane, 2,6-lutidine, or 6-chloro 2-picoline, has been used (U.S. Pat. No. 5,948,720). Other U.S. Pat. Nos. 5,118,768, 5,089,573, 5,118,649, 5,118,767, and 5,294,581 disclose similar methods.

A primary catalyst prepared by the conventional process, due to its low reactivity with hydrogen which is a chain transfer agent, is appropriate for preparing low-molecular materials and essentially requires high hydrogen pressure and driving under high pressure to prepare low-molecular materials.

Typically, a donor plays a role to intentionally suppress reaction of a particular catalytic site to control the molecular structure in the polymer and increase regularity, thereby increasing the crystallinity and molecular weight of the prepared polymer.

The inventors of the instant invention have completed this invention by finding that low molecular weight amorphous polypropylene and a copolymer thereof may easily be prepared by simply mixing a primary catalyst with an alkyl aluminum co-catalyst without adding an internal donor, upon preparing the primary catalyst, and an external donor, upon polymerization, in contrast to preparing amorphous polypropylene by adding an internal donor, upon preparing a primary catalyst, and an external donor, upon polymerization.

SUMMARY

An object of the present invention is to provide a method for easily preparing amorphous polypropylene and a copolymer thereof by simply mixing a primary catalyst with an alkyl aluminum co-catalyst without adding an internal donor upon preparing the primary catalyst and an external donor upon polymerization.

To achieve the foregoing objectives, according to the present invention, there is provided a method for preparing a primary catalyst for preparing low molecular weight amorphous polypropylene, comprising mixing a carrier with a modified solvent (step i), substituting the modified solvent by adding a substituting agent to the mixture of step i (step ii), and adding a titanium compound to the mixture of step ii and stirring them to generate a titanium active site in the carrier (step iii).

Also provided is a primary catalyst prepared by the method according to the present invention.

According to the present invention, there is also provided a method for preparing low molecular weight amorphous polypropylene, comprising injecting hexane in a nitrogen-purged reactor in a volume of 20% to 80% relative to the volume of the reactor (step i), injecting and mixing 1 to 50 times more of first co-catalyst relative to the weight of a primary catalyst with the hexane of step i (step ii), injecting and mixing 1 to 50 times more of second co-catalyst relative to the weight of the primary catalyst with the mixture of step ii (step iii), injecting the primary catalyst in the mixture of step iii, stirring them, and injecting a chain transfer agent (step iv), and injecting propylene at a temperature ranging from 40° C. to 90° C. (step v).

Also provided is low molecular weight amorphous polypropylene prepared by the method according to the present invention.

According to the present invention, there is also provided a method for preparing a low molecular weight amorphous polypropylene copolymer, comprising injecting hexane in a nitrogen-purged reactor in a volume of 20% to 80% relative to the volume of the reactor (step i), injecting and mixing 1 to 50 times more of alkyl co-catalyst relative to the weight of a primary catalyst with the hexane of step i (step ii), injecting the primary catalyst into the mixture of step ii, stirring them, and injecting a chain transfer agent (step iii), and injecting propylene and a monomer for copolymerization into the mixture of step iii at a temperature ranging from 40° C. to 90° C. (step iv).

Also provided is a low molecular weight amorphous polypropylene copolymer prepared by the method according to the present invention. According to the present invention, amorphous polypropylene and a copolymer thereof may easily be prepared by simply mixing a primary catalyst with an alkyl aluminum co-catalyst without adding an internal donor upon preparing the primary catalyst and an external donor upon polymerization.

By the method according to the present invention, the primary catalyst has superior reactivity with hydrogen which is a chain transfer agent, enabling preparation of low molecular weight amorphous polypropylene even under low hydrogen pressure and low-pressure driving conditions.

The method according to the present invention may lower crystallinity and raise hydrogen reactivity by a donor-less process, thereby enabling easier preparation of low molecular weight amorphous polypropylene even under low-pressure driving conditions.

DETAILED DESCRIPTION OF EXEMPLARY EMBODIMENTS

Figure 1:
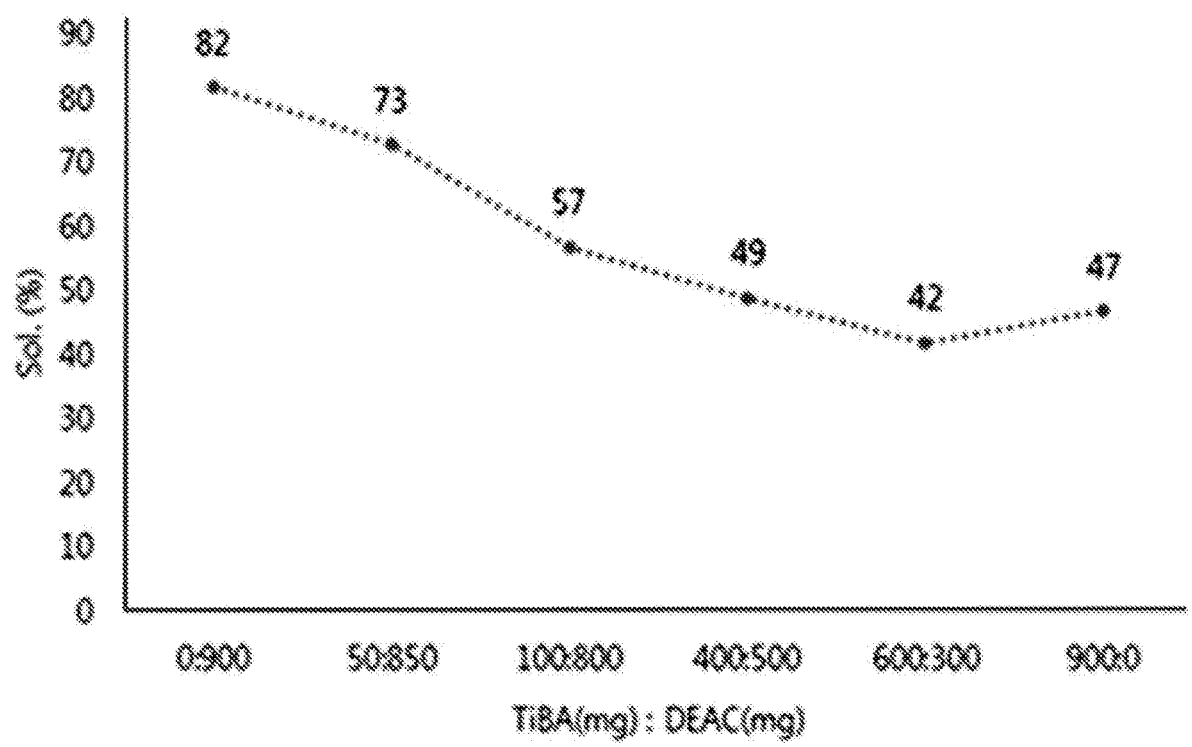
FIG. 1 is a graph illustrating polypropylene crystallinity control data as per co-catalyst mixing ratios in a preparing method according to the present invention.

Hereinafter, the present invention is described in detail.

The present invention provides a method for preparing a primary catalyst to prepare low molecular weight amorphous polypropylene.

The present invention also provides a primary catalyst for preparing low molecular weight amorphous polypropylene which is prepared by a preparing method according to the present invention.

Specifically, the preparing method may include comprise mixing a carrier with a modified solvent (step i); substituting the modified solvent by adding a substituting agent to the mixture of step i (step ii); and adding a titanium compound to the mixture of step ii and stirring them to generate a titanium active site in the carrier.

In the above preparing method, the carrier is a substance that broadens the surface area of the catalyst to raise activity. As the carrier, any one or more selected among magnesium dihalide of magnesium iodide, magnesium bromide, magnesium chloride, or magnesium fluoride, alkyl magnesium halide of hexyl magnesium halide, isobutyl magnesium halide, butyl magnesium halide, propyl magnesium halide, ethyl magnesium halide, or methyl magnesium halide, alkoxy magnesium halide of octoxy magnesium halide, butoxy magnesium halide, isopropoxy magnesium halide, ethoxy magnesium halide, or methoxy magnesium halide, aryloxy magnesium halide of methylpenoxy magnesium halide or penoxy magnesium halide, or dialkoxy magnesium, e.g., dioctoxy magnesium, dibutoxy magnesium, diethoxy magnesium, or dimethoxy magnesium may be used.

In the above preparing method, the modified solvent is a substance used as medium for dissociating the crystalline structure of the carrier to lead to an Mg—Cl—Ti reaction. As the modified solvent, an alcohol whose carbon number is 1 to 20 may be used. Examples of the alcohol preferably include methanol, ethanol, propanol, butanol, pentanol, hexanol, octanol, decanol, 2-ethylhexanol, dodecanol, oxtadecyl alcohol, benzyl alcohol, cyclohexanol, isobutyl alcohol or a mixture thereof. More preferably, ethanol may be used.

It is preferable to use 1 to 15 times more of modified solvent than moles of the carrier.

In the above preparing method, the substituting agent is a substance assisting in substituting the outside for the modified solvent present in the carrier and separating the modified solvent, As the substituting agent, methylaluminium dichloride, dimethylaluminium chloride, ethylaluminium dichloride, diethylaluminium chloride, or a mixture thereof may preferably be used.

It is preferable to use 1 to 20 times more of substituting agent than moles of the carrier.

In the above preparing method, the titanium compound may be represented in Formula 1 below:

In Formula 1 above, R is the hydrocarbon group, X is the halogen atom, and a is a natural number ranging from 0 to 4.

In Formula 1 above, examples of the titanium compound include any one or more selected among titanium tetrahalide of titanium tetraiodide, titanium tetrabromide, or titanium tetrachloride, alkoxy-titanium trihalide of tribromoisobutoxy titanium, tribromoethoxy titanium or alkoxy-titanium trihalide of trobromoisobutoxy titanium, tribromoethoxy titanium, trichloroethoxy titanium, or trichloromethoxy titanium, alkoxy-titanium dihalide of dibromodiethoxy titanium, dichlorodiisobutoxy titanium, dichlorodiethoxy titanium, or dichlorodimethoxy titanium, or tetraalkoxy titanium of tetrabutoxy titanium, tetraethoxy titanium, or tetramethoxy titanium. Preferably, a halogen-containing titanium compound may be preferable. Tetrachloro titanium may be most preferable.

Titanium is a substance that gives catalytic activity. It may be preferable to use 1 to 20 times more of titanium than moles of the carrier.

According to the present invention, there is also provided a method for preparing low molecular weight amorphous polypropylene.

According to the present invention, there is also provided low molecular weight amorphous polypropylene prepared by a preparing method according to the present invention.

Specifically, the preparing method may comprise injecting hexane in a nitrogen-purged reactor in a volume of 20% to 80% relative to the volume of the reactor (step i), mixing 1 to 50 times more of first co-catalyst relative to the weight of a primary catalyst with the hexane of step i (step ii), injecting and mixing 1 to 50 times more of second co-catalyst relative to the weight of the primary catalyst with the mixture of step ii (step iii), injecting the primary catalyst, according to the present invention, with the mixture of step iii, stirring them, and injecting a chain transfer agent (step iv), and injecting propylene at a temperature ranging from 40° C. to 90° C. (step v).

In the above preparing method, the first co-catalyst of step ii is a substance to increase the activity of the primary catalyst. As the first co-catalyst, trimethylaluminum, triethylaluminium, tetraisobutyl aluminium, or a mixture thereof may be preferably used. It may be more preferable to use tetraisobutyl aluminium.

It is preferable to use 1 to 50 times more of first co-catalyst relative to the weight of the primary catalyst. It may be preferable to use hexane diluted to 10 weight % to 20 weight %, more preferably to 15 weight %.

In the above preparing method, the substance used in step iii may be one to reduce crystallinity by controlling the active site of the primary catalyst through its own Cl structure, and as the substance, methylaluminium dichloride, dimethylaluminium chloride, ethylaluminium dichloride, diethylaluminium chloride, or a mixture thereof may be used, and it may be more preferable to use diethylaluminium chloride.

It is preferable to use 1 to 50 times more of second co-catalyst relative to the weight of the primary catalyst. It is preferable to use hexane diluted to 10 weight % to 20 weight %, more preferably, to 15 weight %.

In the above preparing method, the chain transfer agent of step iv is preferably hydrogen, and it is preferable to put 0.1 kg/cm$^2$ to 5 kg/cm$^2$ of chain transfer agent.

According to the present invention, there is also provided a method for preparing a low molecular weight amorphous polypropylene copolymer.

According to the present invention, there is also provided a low molecular weight amorphous polypropylene copolymer prepared by a preparing method according to the present invention.

Specifically, the preparing method may comprise injecting hexane in a nitrogen-purged reactor in a volume of 20% to 80% relative to the volume of the reactor (step i), injecting and mixing 1 to 50 times more of alkyl co-catalyst relative to the weight of a primary catalyst with the hexane of step i (step ii), adding the primary catalyst, according to the present invention, to the mixture of step ii, stirring them, and injecting a chain transfer agent (step iii), and injecting propylene and a monomer for copolymerization to the mixture of step iii at a temperature ranging from 40° C. to 90° C. (step iv).

In the above preparing method, the co-catalyst of step ii is a substance to increase the activity of the primary catalyst. As the co-catalyst, trimethylaluminum, triethylaluminium, tetraisobutyl aluminium, or a mixture thereof, and more preferably, triethylaluminium, may be used.

It is preferable to use 1 to 50 times more of co-catalyst relative to the weight of the primary catalyst. It is preferable to use hexane diluted to 10 weight % to 20 weight %, more preferably, to 15 weight %.

In the above preparing method, the chain transfer agent of step iii is preferably hydrogen. It is preferable to put 0.1 kg/cm$^2$ to 5 kg/cm$^2$ of chain transfer agent.

Preferably, the monomer for copolymerization is ethylene, butene, or a mixture thereof.

According to the present invention, the primary catalyst has superior hydrogen activity, thus enabling preparation of low molecular weight amorphous polypropylene even under low hydrogen pressure and low-pressure driving conditions.

According to the present invention, it is possible to easily prepare low molecular weight amorphous polypropylene and a copolymer thereof by simply mixing a primary catalyst with an alkyl aluminum co-catalyst without injecting an internal donor upon preparing the primary catalyst and an external donor upon polymerization.

According to the present invention, the polypropylene copolymer may have a low molecular weight of 50,000 Mw or less, specifically, ranging from 1,000 to 50,000, under any condition.

According to the present invention, the low molecular weight amorphous polypropylene and a copolymer thereof may be useful as material for adhesives or vehicles.

Now described in detail are preferred embodiments and experimental examples according to the present invention.

The embodiments and experimental examples disclosed herein are mere preferred ones and the present invention is not limited thereto. Rather, there may be various equivalents, replacements, or variations thereto as of the time of filing the instant application.

Embodiment 1

Preparation of Primary Catalyst

A primary catalyst was prepared in the following process.

i) Magnesium chloride was mixed at room temperature for one to six hours with ethanol, as modified solvent, which is 1 to 15 times more relative to moles of magnesium chloride.

ii) 1 to 20 times more of diethylaluminium chloride relative to moles of magnesium chloride was injected to the mixture of step i within one to 60 minutes, thereby replacing EtOH.

iii) 1 to 20 times more of tetrachloro titanium relative to moles of MgCl2 was injected to the mixture of step ii, and they were stirred at 70° C. to 90° C. for one to six hours, generating a Ti active site in magnesium chloride.

Embodiment 2

Preparation of Low Molecular Weight Amorphous Polypropylene

Low molecular weight amorphous polypropylene was prepared in the following process.

i) 20 to 80% of hexane relative to the volume of a reactor was put in the reactor that is being nitrogen-purged.

ii) 1 to 50 times more of first co-catalyst, i.e., tetraisobuthyl aluminium, with hexane 15 wt % diluted, relative to the weight of a primary catalyst, was put in the reactor of step i, and they were mixed at room temperature for one to 30 minutes.

iii) 1 to 50 times more of 15 wt % hexane-diluted second catalyst, i.e., diethylaluminium chloride, relative to the weight of the primary catalyst, was put in the mixture of step ii, and they were mixed at room temperature for one to 30 minutes.

iv) The primary catalyst prepared in Embodiment 1 was put in the mixture of step iii, and they were then stirred for one to 30 minutes, followed by injecting 0.1 to 5 kg/cm$^2$ of hydrogen.

v) Propylene was injected at 40 to 90° C.

Embodiment 3

Preparation of Low Molecular Weight Amorphous Polypropylene Copolymer

A low molecular weight amorphous polypropylene copolymer was prepared in the following process.

i) 20 to 80% of hexane relative to the volume of a reactor was put in the reactor (2L Autoclave type) that was being nitrogen-purged.

ii) 1 to 50 times more of 15 wt % hexane-diluted alkyl co-catalyst, i.e., triethylaluminium, relative to the weight of the primary catalyst was put in the reactor of step i, and they were mixed at room temperature for one to 30 minutes.

iii) The primary catalyst prepared in Embodiment 1 was put in the mixture of step ii, and they were stirred for one to 30 minutes, and 0.1 to 5 kg/cm2 of hydrogen was then injected.

iv) Propylene and ethylene, as monomer for copolymerization, were injected in the mixture of step iii at a temperature ranging from 40° C. to 90° C. At this time, the feed weight ratio of propylene and ethylene ranged from 95:5 to 55:45, and they were injected through a mass flow controller (MFC) (commercially available from Line Tech).

Comparison Example 1

Preparation of Polypropylene Copolymer as Per Prior Art

An amorphous polypropylene copolymer using a conventional catalyst was prepared in the following process.

i) 20 to 80% of hexane relative to a nitrogen-purged reactor was injected into the reactor.

ii) 1 to 50 times more of triethylaluminium, as alkyl co-catalyst, where hexane was diluted to 15 weight %, relative to the weight of the primary catalyst was injected into the reactor of step i and they were mixed at room temperature for one to 30 minutes.

iii) An internal donor-containing primary catalyst (product name: Lynx 1000HA from BASF corporation) was put in the mixture of step ii, and they were stirred for one to 30 minutes, and 0.1 to 5 kg/cm$^2$ of hydrogen was then injected.

iv) Propylene and ethylene, as monomer for copolymerization, were injected in the mixture of step iii at a temperature ranging from 40° C. to 90° C. At this time, the feed weight ratio of propylene and ethylene ranged from 95:5 to 55:45, and they were injected through a mass flow controller (MFC) commercially available from Line Tech.

Experimental Example 1

Analysis of Polypropylene Crystallinity as Per Co-Catalyst Mixing Ratios

To identify the crystallinity of polypropylene which is the final synthetic substance prepared as per the ratio of the second co-catalyst upon preparing polypropylene as per Embodiment 2, the Sol. part of the final synthetic substance prepared was separated, and Sol. % was calculated with respect to the entire weight.

As a result, it could be verified that increasing the ratio of the second co-catalyst is advantageous in preparing amorphous polypropylene (FIG. 1).

Experimental Example 2

Analysis of Molecular Weight of Polypropylene Copolymer as Per Ethylene Feed Quantities To identify the molecular weight of the polypropylene copolymer, as final synthetic substance, as per ethylene feed quantities upon preparing the polypropylene copolymer as per Embodiment 3, the molecular weight was measured.

Figure 2:
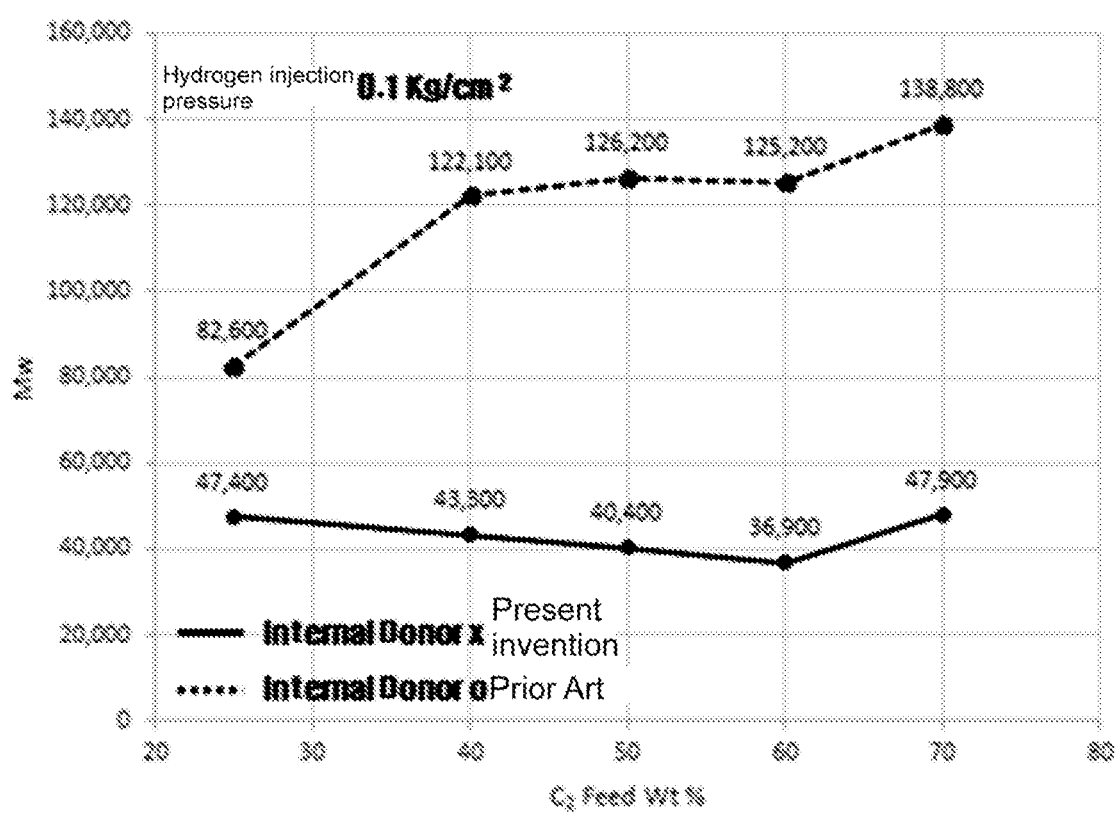
FIG. 2 is a graph illustrating data regarding a primary catalyst's hydrogen reactivity in preparing methods according to the prior art and according to the present invention.

As a result, it could be verified that it had a low molecular weight of 50,000 Mw or less under any ethylene feed conditions and the same feed minimum condition for hydrogen as chain transfer agent. It could also be verified that it exhibited superior hydrogen activity as compared with catalysts prepared as per the prior art and is thus superior in preparing low-molecule substances even under low hydrogen pressures (FIG. 2).

Low molecular weight amorphous polypropylene and a copolymer thereof prepared according to the present invention exhibit low viscosity and sticky characteristics. Thus, they may be intended for various applications, such as life necessities, binders, shoes, as well as adhesives or automobiles.

As set forth above, it would be appreciated by one of ordinary skill in the art that other various changes may be made to the embodiments without altering essential features or technical spirit of the present invention. Thus, the embodiments disclosed herein should be understood not as limiting but as exemplary in all aspects. It should be noted that the scope of the present invention should be defined by the appended claims, not by the description, and that all changes, variations, or equivalents thereto, which may be derived from the claims, also belong to the scope of the present invention.

What is claimed is:

1. A method for preparing an amorphous polypropylene copolymer with a molecular weight ranging from 1,000 Mw to 50,000 Mw, the method comprising:
    (step i) injecting hexane into a nitrogen-purged reactor in a volume of 20% to 80% relative to a volume of the reactor;
    (step ii) injecting and mixing 1 to 50 times more of alkyl co-catalyst relative to a weight of a primary catalyst with the hexane of step i;
    (step iii) injecting a primary catalyst into the mixture of step ii, stirring a primary catalyst-injected mixture, and injecting a chain transfer agent; and
    (step iv) injecting propylene and a monomer for copolymerization into the mixture of step iii at a temperature ranging from 40° C. to 90° C., wherein the primary catalyst is prepared by:
    (step a) mixing a carrier with a solvent;
    (step b) substituting the solvent by adding a substituting agent to the mixture of step a; and
    (step c) adding a titanium compound to the mixture of step b and stirring the titanium compound-added mixture to generate a titanium active site in the carrier, wherein the carrier is any one selected from the group consisting of magnesium dihalide including magnesium iodide, magnesium bromide, magnesium chloride, or magnesium fluoride, alkyl magnesium halide of hexyl magnesium halide, isobutyl magnesium halide, butyl magnesium halide, propyl magnesium halide, ethyl magnesium halide, or methyl magnesium halide, alkoxy magnesium halide of octoxy magnesium halide, butoxy magnesium halide, isopropoxy magnesium halide, ethoxy magnesium halide, or methoxy magnesium halide, aryloxy magnesium halide of methylphenoxy magnesium halide or phenoxy magnesium halide, and dialkoxy magnesium of dioctoxy magnesium, dibutoxy magnesium, diethoxy magnesium, or dimethoxy magnesium, and wherein the substituting agent is any one selected from the group consisting of methylaluminium dichloride, dimethylaluminium chloride, ethylaluminium dichloride, diethylaluminium chloride, and a mixture thereof.

2. The method of claim 1, wherein the alkyl co-catalyst of step ii is any one selected from the group consisting of trimethylaluminum, triethylaluminium, triisobutyl aluminium, and a mixture thereof.

3. The method of claim 2, wherein the monomer for copolymerization of step iv is ethylene, butene, or a mixture thereof.

4. A method for preparing amorphous polypropylene with a molecular weight ranging from 1,000 Mw to 50,000 Mw, the method comprising:
    (step i) injecting hexane into a nitrogen-purged reactor in a volume of 20% to 80% relative to a volume of the reactor;

(step ii) injecting and mixing 1 to 50 times more of first co-catalyst relative to a weight of a primary catalyst with the hexane of step i;

(step iii) injecting and mixing 1 to 50 times more of second co-catalyst relative to a weight of a primary catalyst with the mixture of step ii;

(step iv) injecting a primary catalyst into the mixture of step iii, stirring a primary catalyst-injected mixture, and injecting a chain transfer agent; and (step v) injecting propylene at a temperature ranging from 40° C. to 90° C. wherein the primary catalyst is prepared by:

(step a) mixing a carrier with a solvent;

(step b) substituting the solvent by adding a substituting agent to the mixture of step a; and (step c) adding a titanium compound to the mixture of step b and stirring the titanium compound-added mixture to generate a titanium active site in the carrier, wherein the carrier is any one selected from the group consisting of magnesium dihalide including magnesium iodide, magnesium bromide, magnesium chloride, or magnesium fluoride, alkyl magnesium halide of hexyl magnesium halide, isobutyl magnesium halide, butyl magnesium halide, propyl magnesium halide, ethyl magnesium halide, or methyl magnesium halide, alkoxy magnesium halide of octoxy magnesium halide, butoxy magnesium halide, isopropoxy magnesium halide, ethoxy magnesium halide, or methoxy magnesium halide, aryloxy magnesium halide of methylphenoxy magnesium halide or phenoxy magnesium halide, and dialkoxy magnesium of dioctoxy magnesium, dibutoxy magnesium, diethoxy magnesium, or dimethoxy magnesium, and wherein the substituting agent is any one selected from the group consisting of methylaluminium dichloride, dimethylaluminium chloride, ethylaluminium dichloride, diethylaluminium chloride, and a mixture thereof.

5. The method of claim 4, wherein the first co-catalyst of step ii is any one selected from the group consisting of trimethylaluminum, triethylaluminium, triisobutyl aluminium, and a mixture thereof, and the second co-catalyst of step iii is any one selected from the group consisting of methylaluminium dichloride, dimethylaluminium chloride, ethylaluminium dichloride, diethylaluminium chloride, and a mixture thereof.

* * * * *